Aug. 19, 1958      E. BLAHA      2,847,702
PELLET MAKING
Filed July 25, 1955
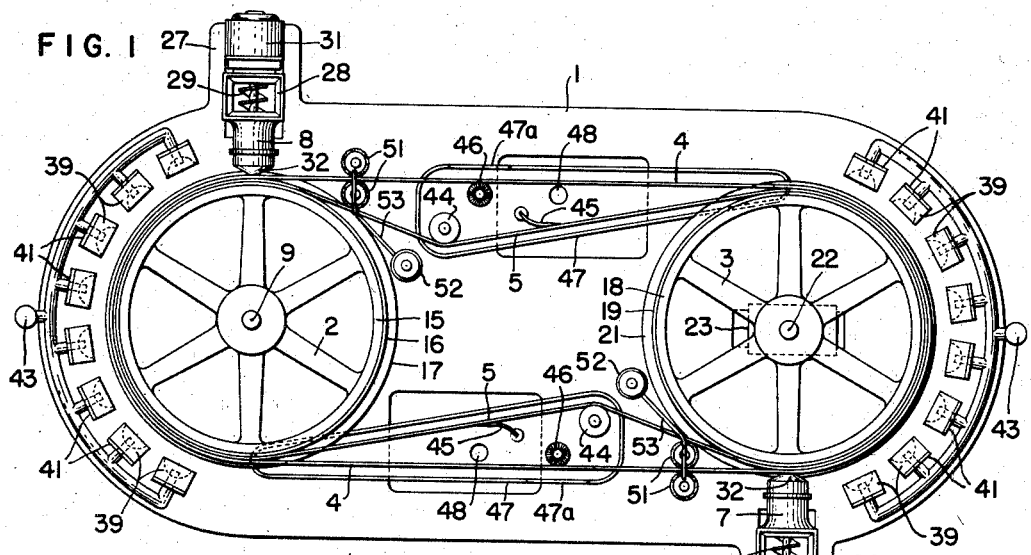
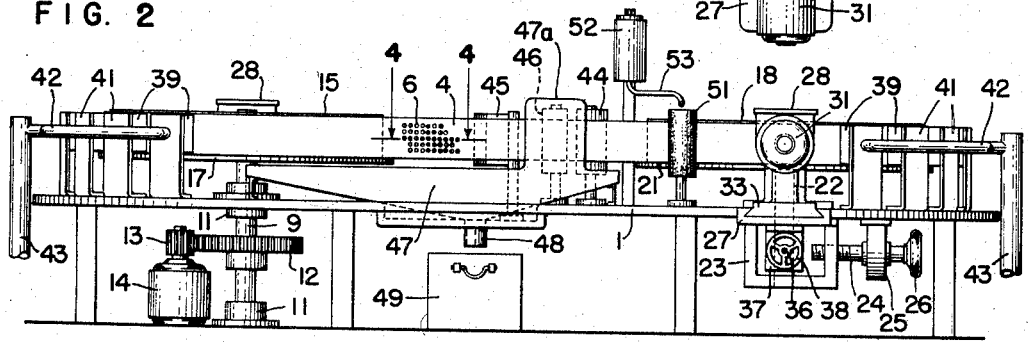
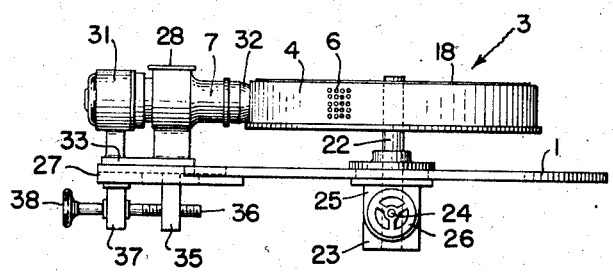
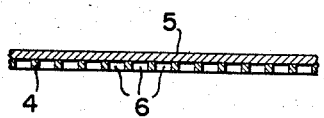
*INVENTOR.*
EMIL BLAHA
BY *E. Wellford Mason*
ATTORNEY.

United States Patent Office 2,847,702
Patented Aug. 19, 1958

2,847,702

PELLET MAKING

Emil Blaha, Cheltenham, Pa., assignor to Selas Corporation of America, Philadelphia, Pa., a corporation of Pennsylvania Application July 25, 1955, Serial No. 524,204

6 Claims. (Cl. 18—5)

The present invention relates to apparatus for making small pellets and more particularly to a machine by which clay pellets can be made continuously and in large quantities.

In the art of fusing clay particles to produce hollow clay spheres, it is customary to start off with clay in granular form. The granules are fed to a heating zone where they are fused into spheres. The granular material includes a large amount of dust that floats in the heating zone, is fused and sticks to the walls thereof. After a relatively short period of time, this fused material accumulates on the walls to such an extent that the operation of the apparatus is impeded, and it must be shut down for cleaning. Various methods of feeding and handling the granular material have been tried, but the dust continues to form and build upon the walls at a prohibitive rate.

I have determined that this difficulty can be completely overcome if the clay is pressed into small pellets and dried prior to the time it is supplied to the heating zone. Furthermore, the use of pellets of a uniform size reduces the feeding problem as well as increasing the uniformity of size of the resulting spheres.

It is the primary object of this invention to provide apparatus to produce clay pellets of uniform size in quantities large enough to satisfy commercial requirements for material of this type. It is a further object of the invention to provide apparatus for making clay pellets that is economical to operate and simple in construction.

It is a further object of the invention to provide a continuously operating apparatus that will produce pellets that are uniform in size and density. A more general object of the invention is to provide apparatus for producing in large quantities small bodies of a plastic material.

An additional object of the invention is to provide a method of making small pellets of a plastic material.

According to the invention, there is provided a pair of metal belts or tapes that are moved through a path in engagement with each other. One of the belts is provided with a plurality of openings, which, when engaged with the other belt, form small cavities into which the plastic material is forced under pressure. The belts are then separated, and the material in the form of small pellets is removed therefrom and collected.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a plan view of the apparatus;

Figure 2 is a side view;

Figure 3 is a view from the right of Figure 1 omitting the burners, and

Figure 4 is a section through the belts taken on line 4—4 of Figure 2.

In the drawings, there is shown a support or platform 1 upon which the apparatus is mounted. This apparatus includes a pair of reels 2 and 3 which serve to drive a pair of endless metal belts 4 and 5 that are placed one on top of the other over the reels. The outer belt 4 is provided with a plurality of perforations 6, each of which forms the wall of a cavity, with the face of belt 5 forming the bottom thereof. Plastic clay is forced into the cavities by means of auger type extruders 7 and 8 each having an outlet the width of the belts.

Reel 2 is mounted on a shaft 9 that is journaled in bearings 11. The shaft has attached thereto a gear 12 which is driven by a pinion 13 on the shaft of a motor 14. The reel itself has a vertically extending rim 15 that is provided with a facing 16 of asbestos against which the inside of belt 5 bears. Below the rim, there is a flange 17 which guides the belts.

Reel 3 is similar to reel 2 in that it has a rim 18 which is faced with asbestos 19 and a flange 21. This reel, however, is not positively driven. Provision is made for horizontal movement of reel 3 toward and from reel 2, so that the belts can be placed thereon and properly tensioned. To this end, the shaft 22 of the reel is journaled for rotation in a frame 23 that can be moved in slots provided in the platform 1. Movement of the frame 23 is obtained by the engagement therewith of a threaded shaft 24 that is journaled for rotation and held against axial movement in a fixed block 25 mounted on the lower surface of platform 1. The outer end of this threaded shaft has a hand wheel 26 thereon by means of which the shaft can be rotated to move reel 3.

When the machine is placed in operation, hand wheel 26 is rotated in a direction to move reel 3 toward reel 2. The belts can then be placed around the rims of the reels resting against the flanges thereof. Hand wheel 26 is then rotated in a direction to move reel 3 away from reel 2 until the belt 4 is properly tensioned in a manner which will be described below.

The extruders 7 and 8 are alike, and they are mounted on the opposite ends and sides of the platform on projections 27 which extends therefrom. Each extruder is provided with a loading chamber 28 and has an auger 29 that is driven at a suitable speed by a geared motor 31 attached thereto. The motor serves to rotate the auger and thereby extrude clay under sufficient pressure to fill the cavities formed by perforations 6 in belt 4.

Each of the extruders is mounted for movement perpendicular to the periphery of the reels. To this end, each extruder and its driving motor are mounted on a plate 33 having a flared lower edge 34. This plate is received in a slot formed in the projection 27 perpendicular to the surface of the reel. The plate 33 and the extruder carried thereby are moved by means of engagement between a member 35 projecting downwardly from the plate through a slot in the platform and a screw 36 that is threaded into this member. The screw is held against axial movement and is journaled for rotation in a bearing member 37 that is mounted on the lower surface of projection 27. A hand wheel 38 is provided by means of which the screw can be rotated to adjust the position of the extruder.

Rotation of the reels as they move the belts past the extruder carries them in front of a series of burners 39 that are used to dry the clay deposited in belt 4. These burners are of a type disclosed in Hess Patent 2,215,079 and serve to direct radiant heat against the belts in sufficient quantities to dry the clay. These burners are located around the periphery of the reels and are individually supported on the platform 1 by means of brackets 41. The burners are supplied with a combustible mixture of fuel and air through a manifold 42 that is connected to a fuel supply pipe 43.

After the pellets have been formed and dried, they are then removed from the belts. This is accomplished by separating the belts immediately after they leave the periphery of the reels. To this end, there is provided an idler roll 44 which extends between the belts and serves to direct belt 5, which is longer than belt 4, through a path separate from belt 4. After belt 5 is separated from belt 4, the surface thereof, which normally engages belt 4, moves past a scraper 45. Belt 4 moves past a brush 46 that is mounted on a suitable supporting shaft, and the bristles of which extend through the perforations thereof. The pellets that are removed from the belts 4 and 5 by the brush and scraper respectively fall into a collector tray 47 that is located beneath the belts and rests on the platform. This tray has a sloping bottom 47 that is provided with an outlet 48 through which the clay pellets will fall. Any suitable collecting means, such as a hopper 49, can be placed below the outlet to receive the pellets.

After the pellets have been removed from the belts, the belts are oiled prior to the time that they are brought together to pass around the next reel. To the end, there is provided a pair of oiler rollers 51 which are so located that they engage opposite sides of belt 4 and the inner side of belt 5. Each of these rollers is provided with a felt covered surface that is kept continuously moistened by oil. The moistening apparatus includes an oil reservoir 52 that has an outlet pipe 53 which extends over the rollers. This pipe is provided with small perforations on its lower surface through which the oil can drop on to the felt.

From an inspection of the drawings, it will be seen that the apparatus is, in effect, two pellet making machines with duplicate provisions for making, drying and collecting the pellets. In the operation of the device, reels 2 and 3 are adjusted to tension belts 4 and 5, so that they are tightly in engagement with each other as they move around the reels. Idler rolls 44 can also be adjusted, if necessary, to adjust the tension of belt 5 with respect to that of belt 4. The reels are then rotated by the motor 14 in a counterclockwise direction in Figure 1. The extruders are located perpendicular to the outer surface of belt 4 immediately after the two belts have been brought together by the vertical rim of one of the reels, so that the belts cannot be separated as the clay is forced against them. Clay that has been moistened enough to be plastic is loaded into the extruder and is forced against the belt 4 with sufficient pressure to deposit clay in the cavities formed by the perforations 6. There is a shearing action by the nose of the extruder and the belt which cuts off each of the sections of deposited clay even with the outer surface of the belt. Thus, each of the cavities or perforations is filled with the clay to form an individual pellet of a size depending upon the diameter of the perforation and the thickness of the belt. Continued rotation of the reels carries the belts which are now loaded with clay past burners 39 that are fired at a sufficient rate to dry the clay prior to the time the reel has rotated 180°. Immediately after the belts leave the opposite surface of the reel, they are separated by the action of idler 44. At this point, the dry pellets will begin to fall from the perforations of belt 4. As the belts are separated, many of the pellets will stick to the surface of belt 5, while many of them will be retained in the perforations of belt 4. Continued movement of the belts will carry belt 5 past scraper 45 which removes the pellets from its surface and will carry belt 4 past brush 46 that will remove the pellets from its perforations. It is noted that the collector tray 47 is provided with a baffle portion that extends upwardly in front of the brush, so that if any of the clay pellets are projected outwardly from the belt, they will hit against this baffle. As the belts continue to move toward the following reel, oilers 51 will oil the opposite surfaces of the belt 4 and the outer surface of belt 5. This oiling is necessary in order to facilitate removal of the pellets from belt 5 and in order to lubricate the front of belt 4 to reduce the friction between this belt and the nose of the extruder.

It has been found that clay spheres of a desirable commercial size can be manufactured from pellets that are from $\frac{1}{32}$ to $\frac{1}{16}$ of an inch in diameter and from 0.008 to 0.010 inch thick. Therefore, the belt 4 is made from a metal strip of the proper thickness, and the perforations are the desired diameter. In a machine of this type, it has been found that a belt speed of at least 30 inches per second can be used without requiring an abnormal pressure on the clay as it is being forced into the perforations. The number of pellets that are produced will depend, of course, upon the speed and width of the belts. Pellets can be made from any suitable type of clay or other material which can be extruded in a plastic state.

From the above description, it will be seen that I have provided a machine for making small pellets of a plastic material. Each of these pellets is a duplicate of the other in size and in density. The dried pellets are sufficiently rigid to withstand commercial screening, if such is necessary, prior to the time that they are used without forming dust.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. A device for forming pellets comprising in combination a first endless belt being provided with a plurality of perforations, a second endless belt longer than said first belt, said second belt being within the loop formed by the first belt, means to support and guide said belts through a closed path with the outer being taut and including means to separate said belts during a portion of said path to increase the length of the path of said second belt and thereby take up the slack created by its greater length, means located at a point in said path where said belts are together to engage said outer belt and fill said perforations with a plastic material, and means located at a point where said belts are separated to remove the plastic material from said perforations.

2. Apparatus for forming pellets comprising in combination a pair of reels mounted for rotation around parallel axes, a pair of endless belts around said reels with one overlying and in engagement with the other, the outer belt being provided with a plurality of perforations, the inner belt being longer than said outer one, a roller between said belts as they travel between said reels to separate said belts and increase the length of the path of said inner belt sufficiently to take up the slack therein, a device having an outlet to extrude plastic material, means to mount said device with its outlet bearing against the outer belt at a point where it is engaged by said inner belt, means to rotate one of said reels to thereby move said belts past said device, said perforations filling with plastic material as the belt is moved, and means located adjacent to said belts at a point where they are separated to remove the plastic material therefrom.

3. Apparatus for making pellets comprising in combination a pair of reels mounted for rotation on parallel axes, a pair of endless belts passing around said reels, one within the other, the reels being so spaced that the outside belt is taut, the outside belt being provided with a plurality of perforations, means to rotate one of said reels, and thereby move said belts, a device for extruding a plastic material and having an outlet, means to mount said device with its outlet in engagement with said perforated belt where the latter engages the inner belt whereby material extruded by said device will be deposited in said perforations, and means for separating said belts between said reels to remove the plastic material from said perforations.

4. Apparatus for forming pellets including in combination a first endless belt provided with a plurality of perforations, a pair of parallel reels over which said belt is placed, means to mount said reels on parallel axes so spaced that said belt is taut, a second endless belt longer than said first belt, said second belt being placed over said reels within said first belt, guide means between said reels around which said second belt passes to take up the slack therein, means engaging said first belt at a point where it is supported by said second belt and one of said reels operative to fill accurately the perforations with a material, and means located between said belts adjacent to said guide means to remove material from the perforation of said first belt.

5. The combination of claim 4 including means located adjacent to said guide means to scrape the surface of said second belt that engages said first belt.

6. In a pellet forming machine, the combination of a plurality of endless bands in engagement with each other and forming a multiplicity of cavities having open tops and closed bottoms, said bands being so configured that one of them forms the side walls of the cavities and the other forms the bottoms thereof, means to move said cavities through a closed path with the open end of the cavities being exposed at all times, means located adjacent to said path to fill accurately said cavities to the top as said cavities move past the same, means to separate said bands at one point in their path to thereby remove the bottoms of the cavities from the side walls thereof, and means located adjacent to said point to remove material placed in said cavities from the side walls and bottoms thereof.

References Cited in the file of this patent

UNITED STATES PATENTS

| | | |
|---|---|---|
| 986,162 | Gare | Mar. 7, 1911 |
| 1,106,087 | Du Pont | Aug. 4, 1914 |
| 1,751,430 | Thomson | Mar. 18, 1930 |
| 2,525,135 | Huff | Oct. 10, 1950 |

FOREIGN PATENTS

| | | |
|---|---|---|
| 131,502 | Great Britain | Aug. 28, 1919 |